(12) United States Patent
Bum

(10) Patent No.: US 7,610,066 B2
(45) Date of Patent: *Oct. 27, 2009

(54) MOBILE TERMINAL FOR CHANGING POSITION OF DISPLAY UNIT IN HORIZONTAL OR VERTICAL DIRECTION

(75) Inventor: Jae Ryong Bum, Gyounggi-do (KR)

(73) Assignee: Impactra Co., Ltd., Seoul (KR)

( * ) Notice: Subject to any disclaimer, the term of this patent is extended or adjusted under 35 U.S.C. 154(b) by 279 days.

This patent is subject to a terminal disclaimer.

(21) Appl. No.: 11/600,284

(22) Filed: Nov. 14, 2006

(65) Prior Publication Data

US 2007/0249407 A1 Oct. 25, 2007

Related U.S. Application Data

(63) Continuation of application No. 10/175,901, filed on Jun. 21, 2002, now Pat. No. 7,200,423.

(30) Foreign Application Priority Data

Jun. 22, 2001 (KR) .......................... 10-2001-35834

(51) Int. Cl.
*H04B 1/38* (2006.01)
*H04Q 7/20* (2006.01)

(52) U.S. Cl. .................. 455/566; 455/550.1; 455/575.3

(58) Field of Classification Search ................. 455/90.3, 455/550.1, 566, 575.1, 575.3; 345/659; 348/14.01
See application file for complete search history.

(56) References Cited

U.S. PATENT DOCUMENTS

| 6,549,789 | B1* | 4/2003 | Kfoury | 455/550.1 |
| 2002/0102946 | A1* | 8/2002 | SanGiovanni | 455/90 |

* cited by examiner

*Primary Examiner*—Lee Nguyen
(74) *Attorney, Agent, or Firm*—RatnerPrestia

(57) ABSTRACT

The present invention discloses a mobile terminal including: a first casing having a key input unit with a plurality of keys; a second casing having a display unit for displaying characters and images; a connecting member having its one end hinge-connected to the first casing to overlap with the first casing, and its other end connected to contact one area of the second casing; a rotating means provided between one area of the second casing and the other end of the connecting member, for rotating the second casing along a contact surface to the connecting member within a predetermined angle; and a signal processing device for converting an image displayed on the display unit, when the second casing is rotated by the rotating means. The mobile terminal can mechanically change the position of the display unit in the horizontal or vertical direction to vary the magnitude of the image displayed on the display unit, so that the user can watch movies, motion pictures and contents through a larger screen.

10 Claims, 6 Drawing Sheets

MOBILE TERMINAL FOR CHANGING POSITION OF DISPLAY UNIT IN HORIZONTAL OR VERTICAL DIRECTION

BACKGROUND OF THE INVENTION

1. Field of the Invention

The present invention relates to a mobile terminal, and in particular to a mobile terminal which can convert a width and height of an image displayed on a display unit by changing a horizontal or vertical position of the display unit.

2. Description of the Background Art

Recently, a number of people using a mobile terminal has been increased due to development of the communication industry. Almost everyone can communicate with the other party during the movement.

Moreover, the mobile terminal provides a calculator function, an electric organizer function and a calendar function. Since the mobile terminal is accessible to an internet, the user can conveniently receive a variety of information during the movement. In addition, the mobile terminal can store motion picture files such as the MPEG4, and thus the user can watch a movie or animation anywhere through the mobile terminal.

In the conventional mobile terminal, a dimension of an image displayed on a display unit is determined according to a ratio of a vertical signal to horizontal signal scanned to the display unit. Although a width (horizontal) of the display unit of the mobile terminal is smaller than a height (vertical) thereof, a width (horizontal) of a screen for displaying a movie or the like is larger than a height (vertical) thereof. Therefore, the user fails to watch the image through the whole display unit. That is, the user can watch the contents such as motion pictures through part of the display unit not at a screen ratio of the movie.

SUMMARY OF THE INVENTION

Accordingly, it is an object of the present invention to provide a mobile terminal which can enable the user to easily watch the contents such as motion pictures by changing a position of a display unit in a horizontal/vertical direction and converting a dimension of an image displayed on the display unit according to a mechanical movement of the display unit.

In order to achieve the above-described object of the invention, there is provided a mobile terminal including: a first casing having a key input unit with a plurality of keys; a second casing having a display unit for displaying characters and images; a connecting member having its one end hinge-connected to the first casing to overlap with the first casing, and its other end connected to contact one area of the second casing; a rotating means provided between one area of the second casing and the other end of the connecting member, for rotating the second casing along a contact surface to the connecting member within a predetermined angle; and a signal processing device for converting a ratio of width to height of an image displayed on the display unit, when the second casing is rotated by the rotating means.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

A mobile terminal in accordance with a preferred embodiment of the present invention will now be described in detail with reference to the accompanying drawings.

Figure 1:
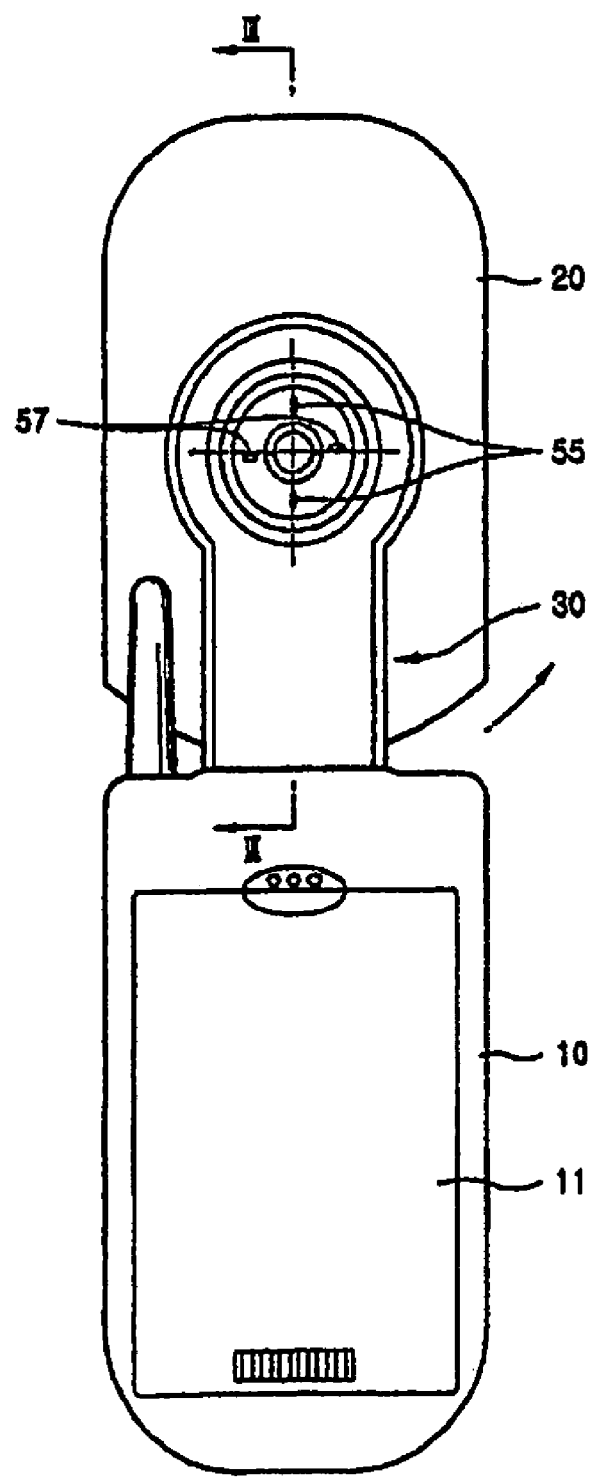
FIGS. 1 and 2 are rear perspective views respectively illustrating a mobile terminal in accordance with the present invention.
Figure 2:
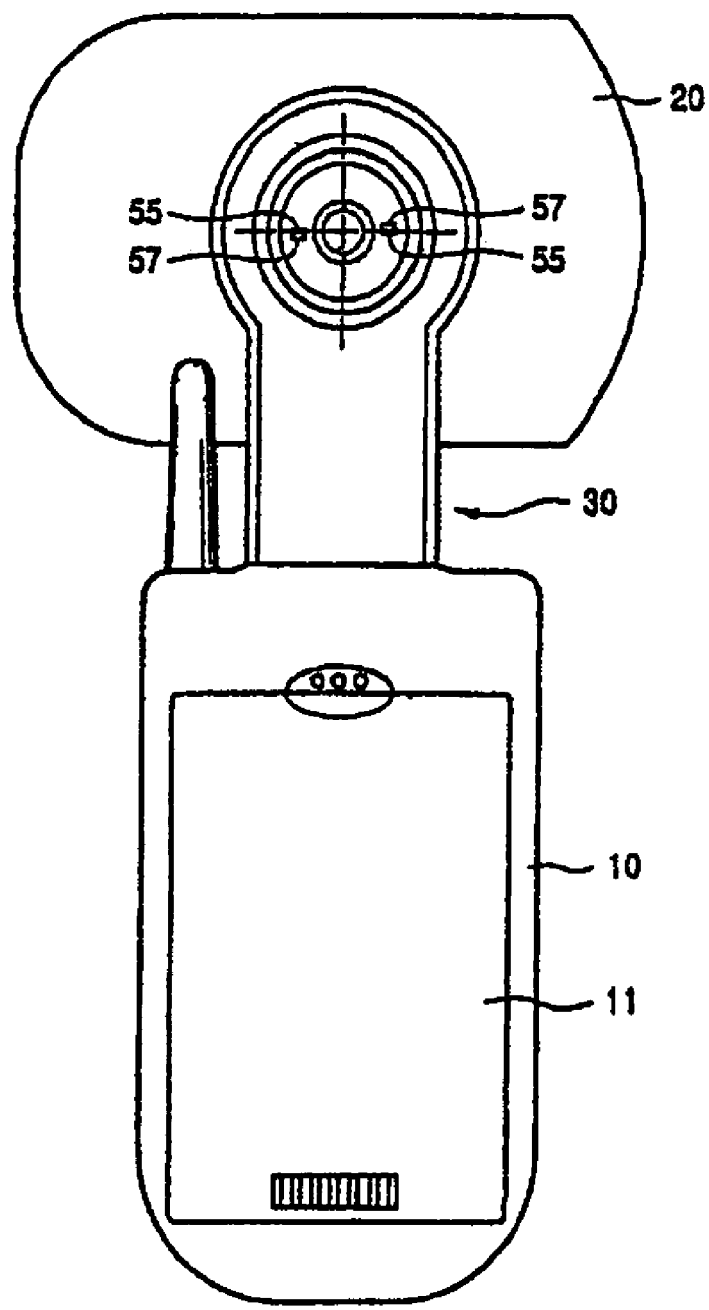
Figure 3:
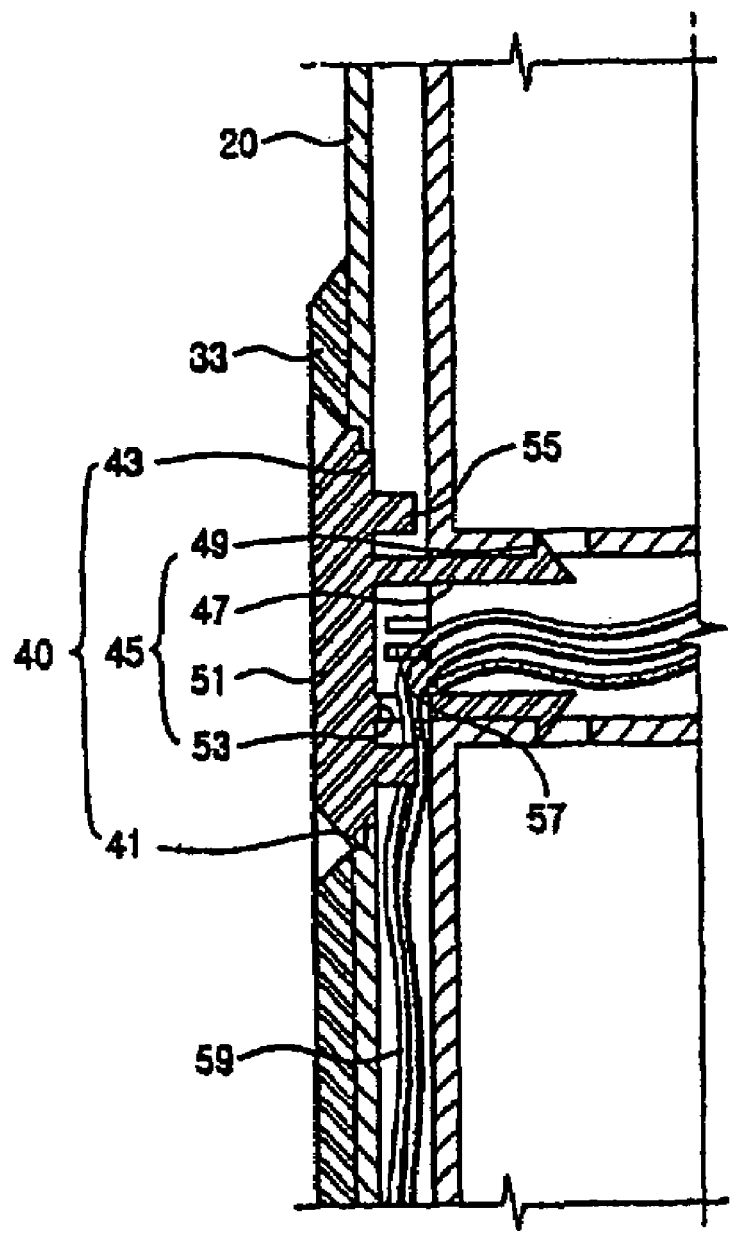
FIG. 3 is a side-sectional view taken along line III-III of FIG. 1.

FIGS. 1 and 2 are rear perspective views respectively illustrating the mobile terminal in accordance with the present invention, and FIG. 3 is a side-sectional view taken along line III-III of FIG. 1. For convenience sake, FIG. 3 exaggerates a rotating means 40 for connecting the other end of a connecting member 30 and a second casing 20.

The mechanical mechanism for rotating a display unit of the mobile terminal in accordance with the present invention will now be described in detail with reference to the accompanying drawings.

The mobile terminal includes a first casing 10 having a power battery 11 and a key input unit 13, a second casing 20 having a display unit 21, and a connecting member 30 provided between the first casing 10 and the second casing 20, for connecting the first casing 10 to the second casing 20. One end 31 of the connecting member 30 is hinge-connected to the first casing 10 to overlap with the first casing 10, and the other end 33 is connected to one area of the second casing 20 so that the second casing 20 can be rotated within a predetermined angle.

A rotating means 40 for rotating the second casing 20 is composed of a bearing hole 41 formed at the other end of the connecting member 30, a rotation shaft hole 43 formed at the second casing 20 to correspond to the bearing hole 41, and a rotation shaft member 45 installed to connect the bearing hole 41 to the rotation shaft hole 43, for rotating the second casing 20.

The rotation shaft member 45 includes a cylindrical rotation shaft unit 47 having a predetermined length to connect the bearing hole 41 to the rotation shaft hole 43, a hook unit 49 formed along the circumference direction of one end of the rotation shaft unit 47 and connected to the second chasing 20, and a cover unit 51 extended from the other end of the rotation shaft unit 47 in the radius direction of the rotation shaft unit 47.

Here, a connection line passing hole 53 is formed at the cylindrical area of the rotation shaft unit 47 so that a connection line 59 for electrically connecting the first casing 10 to the second casing 20 can pass therethrough. The cover unit 51 covers the cylindrical area of the rotation shaft unit 47 to intercept external foreign substances, and also improves appearance.

In addition, the rotating means 40 further includes a position limiting means provided between the rotation shaft member 45 and the second casing 20, for limiting a rotation position of the second casing 20. The position limiting means has a limiting protrusion 55 protruded from the cover unit 51 of the rotation shaft member 45 toward the outer surface of the second casing 20, for limiting the rotation position of the second casing 20, and a position limiting jaw 57 protruded from the second casing 20 for contacting the limiting protrusion 55. The limiting protrusion 55 and the position limiting jaw 57 are alternately formed at intervals of 90° for preventing the second casing 20 from deviating from the horizontal or vertical position due to an excessive rotation force. Since the position limiting means is installed to limit the rotation position and direction of the second casing 20, the connection line 59 for connecting the first casing 10 to the second casing 20 is not twisted.

Figure 4:
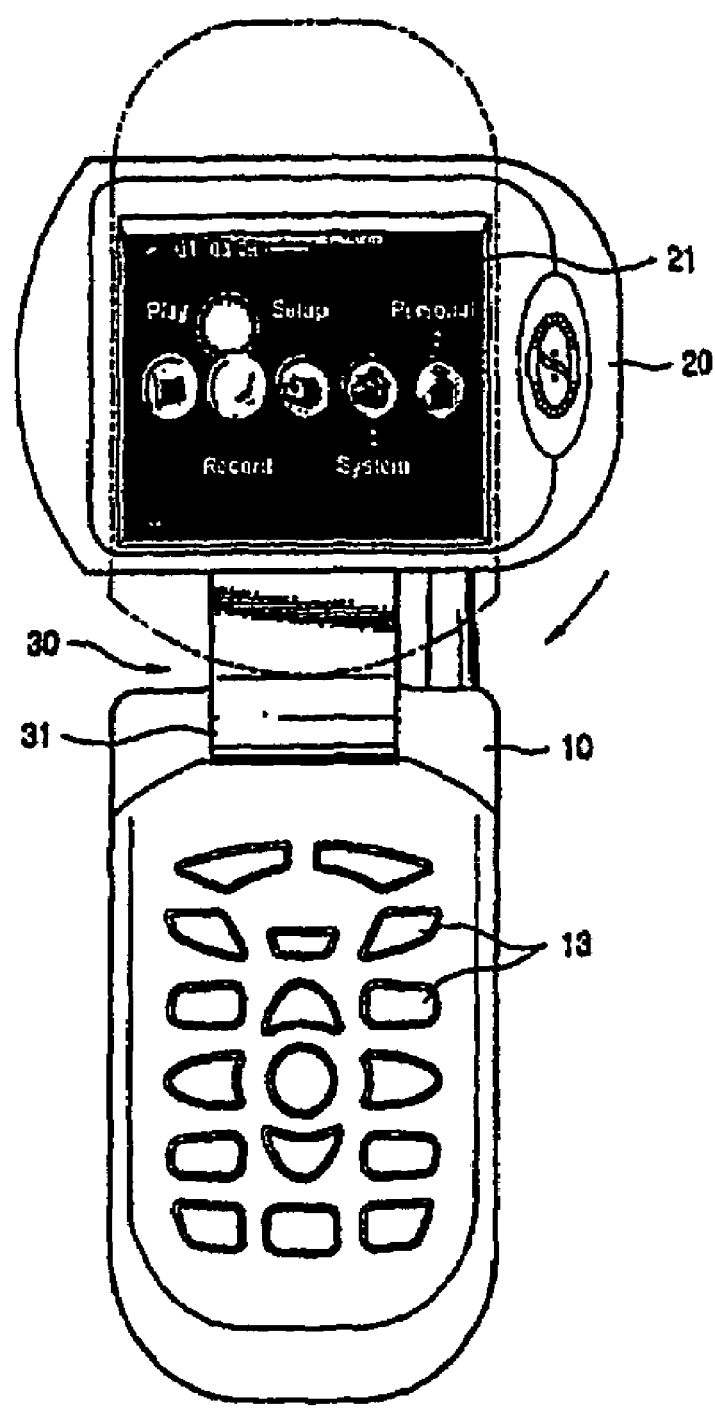
FIG. 4 is an operation state view illustrating the mobile terminal in accordance with the present invention.

FIG. 4 is an operation state view illustrating the mobile terminal in accordance with the present invention. Referring to FIG. 4, when the second casing 20 is rotated in the clockwise direction (arrow direction) due to a predetermined force, the display unit 21 of the second casing 20 is rotated at 90° to be positioned in the horizontal direction. Conversely, when the second casing 20 is rotated in the anticlockwise direction due to a predetermined force, the display unit 21 of the second casing 20 is rotated at 90° to be positioned in the vertical direction. That is, the display unit 21 is rotated at 90° to be positioned in the horizontal or vertical direction by the position limiting means, the limiting protrusion 55 and the position limiting jaw 57.

In the above-described embodiment, the limiting protrusion 55 and the position limiting jaw 57 limit the rotation position and direction of the second easing 20, but various limiting means such as an elastic pressure rotating button for rotating the second casing 20 merely when a predetermined force is applied between the second casing 20 and the connecting member 30 can limit the rotation position of the second casing 20.

In addition, when an electrical motor is mounted on the rotating means 40, and a special button for controlling the operation of the electrical motor is set up or a special function is provided to the existing button of a cellular phone by programming, the display unit can be automatically rotated by operating special keys.

Figure 5:
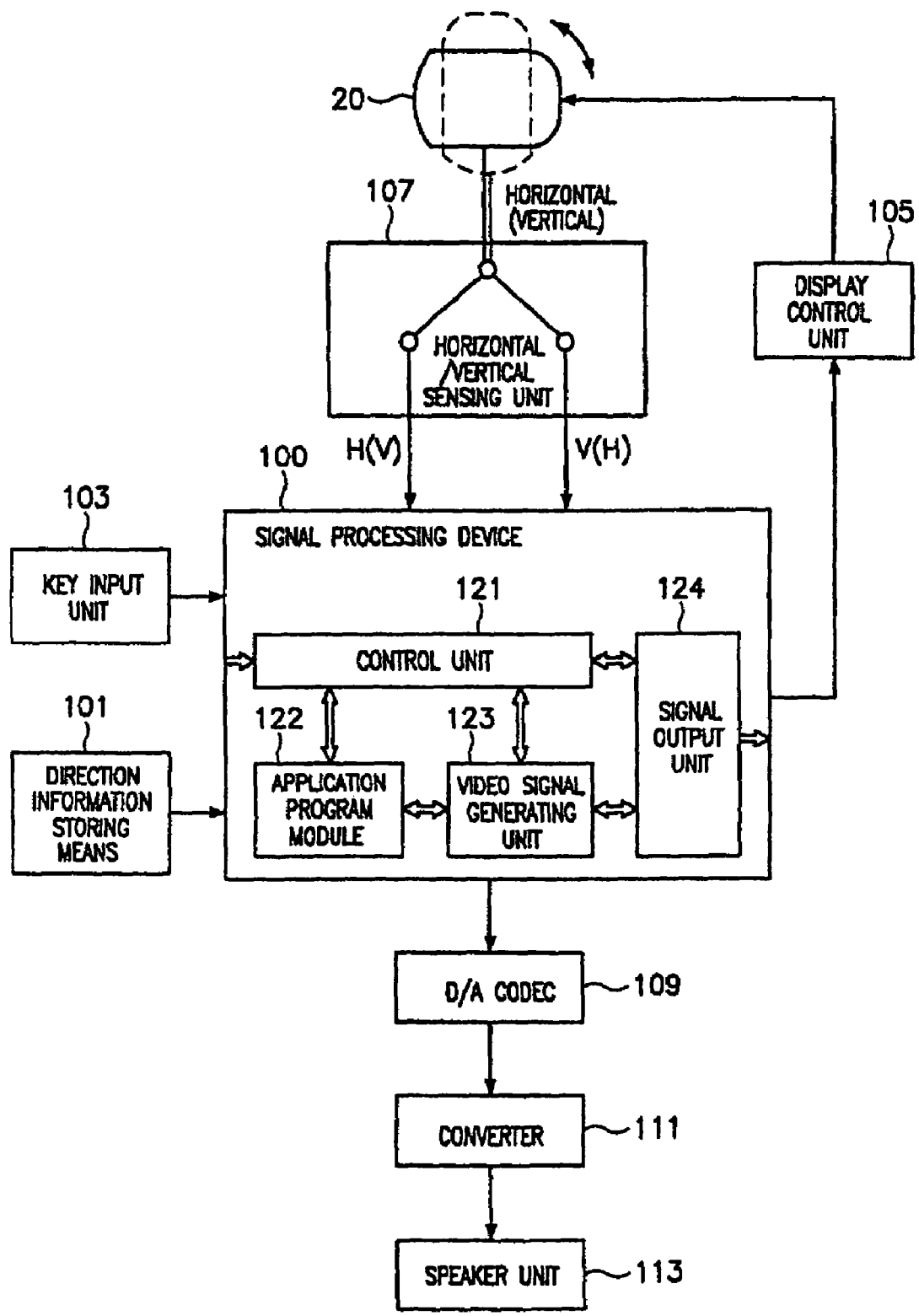
FIG. 5 is a schematic block diagram illustrating a display unit in image conversion in accordance with the present invention.

FIG. 5 is a block diagram illustrating the electronic mechanism for converting a ratio of width to height of the image displayed on the display unit in accordance with the present invention.

The mobile terminal includes a horizontal/vertical sensing unit 107 for sensing a rotation direction of the display unit, a direction information storing means 101 for storing a sensing result of the horizontal/vertical sensing unit 107, a signal processing device 100 for converting a horizontal/vertical ratio of the image displayed on the display unit, a key input unit 103 for receiving an external operation signal, and a display control unit 105 for receiving the image data and control signal from the signal processing device 100, and displaying the image on the display unit.

The mobile terminal further includes a codec 109 for transforming a data to externally provide an audio signal according to the image displayed on the display unit 21, a D/A converter 111 for converting an analog signal into a digital signal, and a speaker unit 113 for providing the converted signal in form of an audible signal.

Here, the horizontal/vertical sensing unit 107 includes a rotation sensor for sensing the rotation direction of the second casing 20 during the rotation, and outputting a sensed value according to the rotation position of the second casing 20.

In addition, the signal processing device 100 includes a control unit 121 for controlling gearing of each component according to an operation program, an application program module 122 for controlling a screen actually displayed on the display unit, a video signal generating unit 123 for generating a converted image by converting a ratio of width to height of the image displayed on the display unit, and a signal output unit 124 for generating a synchronous signal for normally displaying the converted image on the display unit, and outputting the synchronous signal and data information on the image whose horizontal/vertical ratio is converted to the display control unit 105.

The operation of the mobile terminal in accordance with the present invention will now be explained. As illustrated in FIG. 4, when the second casing 20 receives a predetermined force in the clockwise direction, the second casing 20 is rotated along the rotation shaft unit 47. Therefore, the display unit 21 is rotated from the vertical position to the horizontal position. As described above, the rotating operation is automatically performed by using the electrical motor.

When the display unit 21 is rotated, the horizontal/vertical sensing unit 107 senses the rotation of the display unit 21, inputs a resulting value to the signal processing device 100, and stores it in the direction information storing means 101.

The signal processing device 100 confirms rotation of the display unit 21, and adjusts horizontal/vertical resolution of the image of the application program displayed on the display unit 21. In detail, the control unit 21 reads the display image from the application program module 122, and the video signal generating unit 123 adjusts a ratio of the horizontal/vertical resolution of the image.

Figure 6:
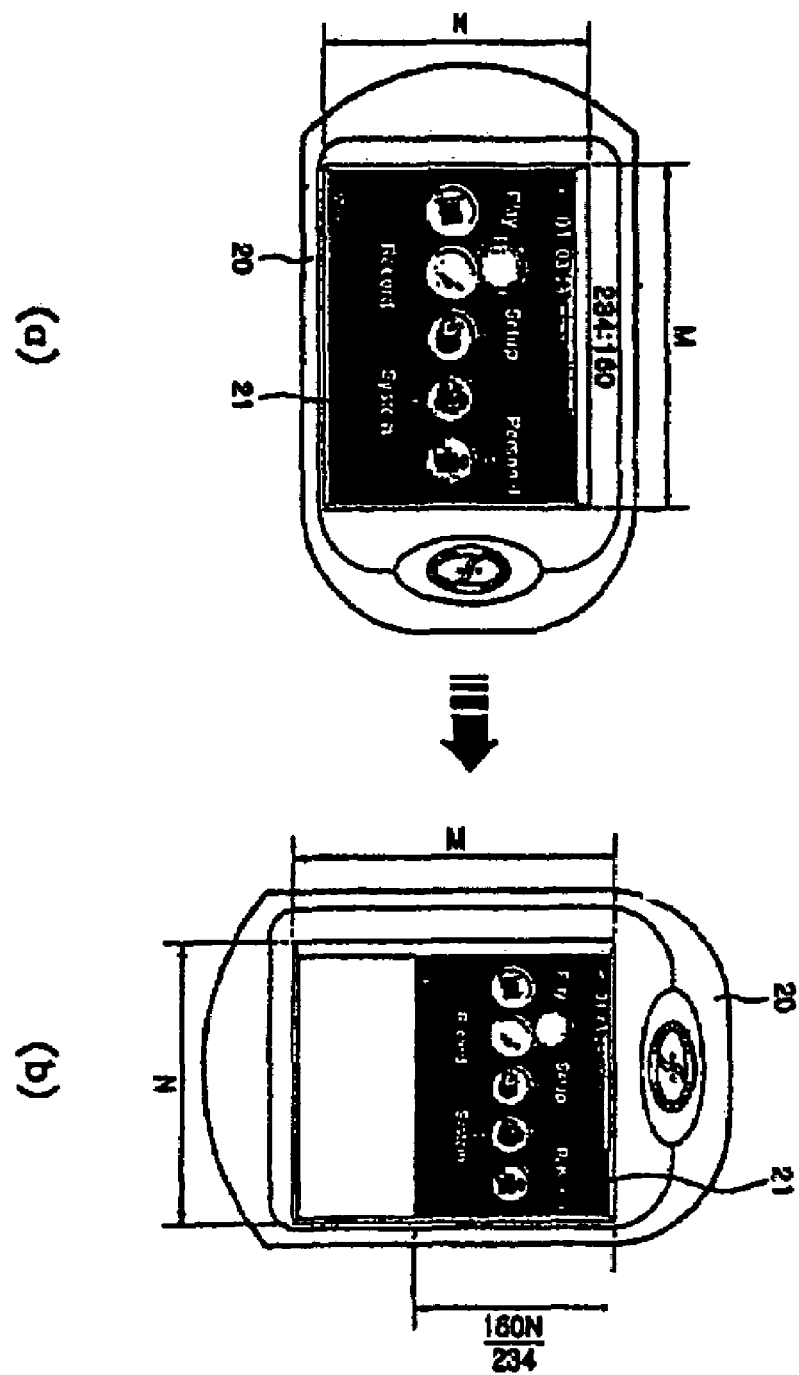
FIGS. 6*a* and 6*b* are a display state view illustrating the display unit in the image conversion in accordance with the present invention.

The image displayable area of the display unit according to the horizontal and vertical positions of the display unit will now be described with reference to FIG. 6. As shown in FIG. 6, the display unit 21 have M cells in the horizontal direction and N cells in the vertical direction. FIG. 6($a$) is a state view illustrating the image area displayed on the display unit 21 when the display unit 21 of the second casing 20 is rotated in the vertical direction along the rotating means 40. When the display unit 21 is put in the horizontal position, M horizontal cells and N vertical cells can display the image. As a result, the user can watch movies, motion pictures and contents in a relatively large screen.

Here, when it is presumed that M horizontal cells and N vertical cells are formed at a ratio of 234 to 160, a dimension of the image displayable area of the display unit 21 when the display unit 21 is rotated in the vertical direction can be calculated. As depicted in FIG. 6($b$), when the display unit 21 is put in the vertical position, N vertical cells are converted to the horizontal position, and M horizontal cells are converted into the vertical position. Here, when a ratio of N horizontal cells is 234 and a ratio of displayable vertical images is 160, a number of the image displayable cells is calculated among M vertical cells (for example, when 234:160 is equal to N:x, vertical cells are 160N/234). In the case that the horizontal/vertical ratio according to the image area is set up differently, the magnitude of the image area displayed on the display unit can be changed.

The image information converted horizontally or vertically in the video signal generating unit 123 is inputted to the display control unit 105 through the signal output unit 124. When the signal output unit 124 outputs the image information, it simultaneously provides horizontal and vertical synchronous signals to the display control unit 105, thereby completely displaying the image on the display unit at a converted ratio.

In the above-described embodiment, when the display unit is positioned in the horizontal or vertical direction, the user can watch the movies, motion pictures and contents. However, when the display unit is positioned in the horizontal direction, the user can watch the movies, motion pictures and contents and when the display unit is positioned in the vertical direction, the user can use the mobile terminal.

As the present invention may be embodied in several forms without departing from the spirit or essential characteristics thereof, it should also be understood that the above-described embodiment is not limited by any of the details of the foregoing description, unless otherwise specified, but rather should be construed broadly within its spirit and scope as defined in the appended claims, and therefore all changes and modifications that fall within the metes and bounds of the claims, or equivalences of such metes and bounds are therefore intended to be embraced by the appended claims.

As discussed earlier, the mobile terminal in accordance with the present invention can mechanically change the position of the display unit to vary the magnitude of the image displayed on the display unit, so that the user can watch the movies, motion pictures and contents through a larger screen.

This application claims priority to Korean Application No. KR 2001-35834, filed Jun. 22, 2001, the entire disclosure of which is hereby incorporated by reference as if fully set forth herein.

What is claimed is:

1. A mobile terminal comprising:
   a first casing having a key input unit with a plurality of keys;
   a second casing having a display unit for displaying characters and images;
   a connecting member having its one end hinge-connected to the first casing to overlap with the first casing, and its other end connected to contact one area of the second casing;
   a rotating means provided between one area of the second casing and the other end of the connecting member, for rotating the second casing along a contact surface to the connecting member within a predetermined angle; and
   a signal processing device for selectively converting horizontal and vertical resolution of an image displayed on the display unit, when the second casing is rotated by the rotating means,
   wherein the rotating means comprises:
      a bearing hole passing through a plate surface of the other end of the connecting member;
      a rotation shaft hole formed at the second casing to correspond to the bearing hole; and
      a rotation shaft member inserted into the bearing hole and the rotation shaft hole, for rotating the second casing along the contact surface to the connection member; and
      a position limiting means provided between the rotation shaft member and the outer surface of the second casing, for limiting a rotation position of the second casing.

2. The mobile terminal according to claim 1, wherein the rotation shaft member comprises:
   a rotation shaft unit formed in a cylindrical shape;
   a hook unit formed at one end of the rotation shaft unit, for preventing the rotation shaft unit from being deviated from the second casing; and
   a cover unit extended from the other end of the rotation shaft unit in the radius direction of the rotation shaft unit.

3. The mobile terminal according to claim 2, wherein the position limiting means are a limiting protrusion protruded from the cover unit toward the second casing, and a position limiting jaw protruded from the plate surface of the second casing toward the cover unit for contacting the limiting protrusion and limiting the rotation of the second casing.

4. The mobile terminal according to claim 2, wherein a connection line passing hole is formed at the side of the rotation shaft unit, for receiving connection lines for electrically connecting the first casing to the second casing.

5. The mobile terminal according to claim 1, further comprising a display control unit for receiving the converted image from the signal processing device, and displaying the image on the display unit.

6. The mobile terminal according to claim 1, further comprising a horizontal/vertical sensing unit for sensing a rotation direction of the second casing during the rotation, and outputting a resulting value.

7. The mobile terminal according to claim 1, wherein the signal processing device comprises:
   an application program module for providing an image to be displayed on the display unit;
   a video signal generating unit for receiving the image which will be inputted to the display unit from the application program module according to the rotation of the second casing, and converting the horizontal and vertical resolution; and
   a signal output unit for outputting the image data converted in the video signal generating unit with a synchronous signal.

8. The mobile terminal according to claim 7, further comprising a horizontal/vertical sensing unit for sensing a rotation direction of the second casing during the rotation, and outputting a resulting value.

9. The mobile terminal according to claim 8, further comprising a direction information storing means for storing a sensing result of the horizontal/vertical sensing unit.

10. The mobile terminal according to claim 9, wherein the signal processing device often checks the rotation state of the display unit stored in the direction information storing means, and provides an appropriate image.

* * * * *